(12) United States Patent
Al Shammari et al.

(10) Patent No.: US 11,501,038 B2
(45) Date of Patent: Nov. 15, 2022

(54) DYNAMIC CALIBRATION OF RESERVOIR SIMULATION MODELS USING PATTERN RECOGNITION

(71) Applicant: Saudi Arabian Oil Company, Dhahran (SA)

(72) Inventors: Mohammad Methgal Al Shammari, Dhahran (SA); Marko Maucec, Englewood, CO (US); Babatunde Moriwawon, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 271 days.

(21) Appl. No.: 16/670,505

(22) Filed: Oct. 31, 2019

(65) Prior Publication Data

US 2021/0133368 A1 May 6, 2021

(51) Int. Cl.
*G06F 30/20* (2020.01)
*G01V 99/00* (2009.01)
(Continued)

(52) U.S. Cl.
CPC .............. *G06F 30/20* (2020.01); *E21B 43/00* (2013.01); *G01V 99/005* (2013.01); *G06F 30/23* (2020.01);
(Continued)

(58) Field of Classification Search
CPC ...... E21B 41/00; E21B 43/00; E21B 2200/20; E21B 2200/22; G06N 20/00; G06F 30/20;
(Continued)

(56) References Cited

U.S. PATENT DOCUMENTS 8,700,370 B2 4/2014 Landa
8,903,694 B2 12/2014 Wallis et al.
(Continued)

OTHER PUBLICATIONS

Larsen, Leif. "Wellbore Pressures in Reservoirs With Constant-Pressure or Mixed No-Flow/Constant-Pressure Outer Boundary." Journal of petroleum technology 36.09 (1984). pp. 1613-1616. (Year: 1984).*

(Continued)

*Primary Examiner* — John E Johansen
(74) *Attorney, Agent, or Firm* — Fish & Richardson P.C.

(57) ABSTRACT

Methods for validating reservoir simulation models can include determining one or more time segments of fluid recovery of a reservoir; generating, for a first time segment, one or more streamlines on a full simulation grid corresponding to the reservoir by performing one or more reservoir simulations; generating, for the first time segment, one or more drainage volumes; generating, for the first time segment, grid regions along one or more no-flow boundaries of the one or more drainage volumes; generating, for the first time segment, sector models corresponding to the grid regions; performing, for the first time segment, a history matching process corresponding to a time phase simultaneously on each of the sector models to generate, for each sector model, a history matching output; and comparing, for the first time segment and for each sector model, the history matching output for that sector model to a tolerance threshold.

20 Claims, 12 Drawing Sheets
(4 of 12 Drawing Sheet(s) Filed in Color)

(51) Int. Cl.
| | |
|---|---|
| *G06F 113/08* | (2020.01) |
| *G06F 30/23* | (2020.01) |
| *E21B 43/00* | (2006.01) |
| *G06K 9/62* | (2022.01) |
| *G06N 20/00* | (2019.01) |
| *E21B 41/00* | (2006.01) |

(52) U.S. Cl.
CPC ......... *G06K 9/6223* (2013.01); *G06K 9/6267* (2013.01); *G06N 20/00* (2019.01); *E21B 41/00* (2013.01); *E21B 2200/20* (2020.05); *E21B 2200/22* (2020.05); *G06F 2113/08* (2020.01)

(58) Field of Classification Search
CPC ... G06F 30/23; G06F 2113/08; G01V 99/005; G06K 9/6223; G06K 9/6267
USPC .......................................................... 703/10
See application file for complete search history.

(56) References Cited

U.S. PATENT DOCUMENTS

| | | | |
|---|---|---|---|
| 9,043,188 B2 | 5/2015 | Yeten et al. | |
| 9,260,948 B2 | 2/2016 | Maucec et al. | |
| 9,646,414 B2 | 5/2017 | Maucec et al. | |
| 9,732,592 B2 | 8/2017 | Carvajal et al. | |
| 9,779,060 B2 | 10/2017 | Maucec | |
| 9,922,142 B2 | 3/2018 | Dachang et al. | |
| 10,242,136 B2 | 3/2019 | Fung | |
| 2012/0253770 A1* | 10/2012 | Stern | G01V 11/00 703/10 |
| 2014/0214386 A1 | 7/2014 | Gehin | |
| 2015/0032431 A1 | 1/2015 | Shi et al. | |
| 2015/0338550 A1 | 11/2015 | Wadsley | |
| 2016/0004800 A1 | 1/2016 | Singh et al. | |
| 2016/0047943 A1* | 2/2016 | Maucec | G01V 1/30 703/2 |
| 2016/0048001 A1 | 2/2016 | McCreight | |
| 2016/0131801 A1 | 5/2016 | Singh et al. | |
| 2016/0139298 A1 | 5/2016 | Singh et al. | |
| 2018/0016897 A1 | 1/2018 | Willberg et al. | |

OTHER PUBLICATIONS

Prasun, Samir, and Anil Kumar. "Drainage Areas, Shapes, and Reserves for Wells in Reservoirs with Multiple Fluid Contacts/Constant Pressure Boundaries." SPE Annual Technical Conference and Exhibition. OnePetro, 2019. pp. 1-18. (Year: 2019).*
Pouladi, Behzad, et al. "Fast marching method assisted sector modeling: Application to simulation of giant reservoir models." Journal of Petroleum Science and Engineering 149 (2017). pp. 707-719. (Year: 2017).*
Hoffman, B. Todd, and Jef Caers. "Regional probability perturbations for history matching." Journal of Petroleum Science and Engineering 46.1-2 (2005). pp. 53-71. (Year: 2005).*
Park, Hyucksoo, et al. "History matching and uncertainty quantification of facies models with multiple geological interpretations." Computational Geosciences 17.4 (2013). pp. 609-621. (Year: 2013).*
Park, Han-Young, et al. "Improved decision making with new efficient workflows for well placement optimization." Journal of Petroleum Science and Engineering 152 (2017). pp. 81-90. (Year: 2017).*
Gervais-Couplet, Veronique, et al. "History matching using local gradual deformation." EUROPEC/EAGE Conference and Exhibition. OnePetro, 2007. pp. 1-12. (Year: 2007).*
Thiele, Marco R. "Streamline simulation." 6th International Forum on Reservoir Simulation, Schloss Fuschl, Austria. vol. 3. 2001. pp. 1-47. (Year: 2001).*
Thiele, Marco R., Darryl H. Fenwick, and Rod P. Batycky. "Streamline-assisted history matching." 9th International Forum on Reservoir Simulation, Abu Dhabi, United Arab Emirates. 2007. pp. 1-41. (Year: 2007).*
Garyfallidis et al, "Recognition of white matter bundles using local and global streamline-based registration and clustering," NeuroImage, 170, pp. 1-12, Jul. 2017, 12 pages.
Matthews et al., "A Method for Determination of Average pressure in a Bounded Reservoir," TP 3876, SPE296-G, Petroleum Transaction, AIME, presented at the Petroleum Branch Fall Meeting, Dallas, Oct. 19-21, 1953, 10 pages.
Middya and Dogru, "Computation of Average Well Drainage Pressure for a Parallel Reservoir Simulator," SPE 120816, SPE Saudi Arabia Section Technical Sy2008, presented at the 2008 SPE Saudi Arabia Section Technical Symposium in Alkhobar, Saudi Arabia, May 10-12, 2008, 6 pages.
Peaceman, "Interpretation of Well-block Pressures in Numerical Reservoir Simulation with Non-Square Grid Blocks and Anisotropic Permeability," Society of Petroleum Engineers Journal, Jun. 1983, 13 pages.
Gervais et al., "History Matching Using Local Gradual Deformation" 69th Eage Conference and Exhibition Session, Jun. 2007, 12 pages.
Hoffman et al., "Regional Probability Perturbations for History Matching" Journal of Petroleum Science and Engineering, vol. 46, No. 1-2, Nov. 2004, 53-71, 19 pages.
Park et al., "History Matching and Uncertainty Quantification of Facies Models with Multiple Geological Interpretations" Computational Geosciences vol. 17, No. 4, Feb. 2013, 609-621, 13 pages.
Park et al., "Improved Decision Making with New Efficient Workflows for Well Placement Optimization" Journal of Petroleum Science and Engineering, vol. 152, Feb. 2017, 81-90, 10 pages.
PCT International Search Report and Written Opinion in International Appln. No. PCT/US2020/057906, dated Feb. 15, 2021, 17 pages.
PCT International Search Report and Written Opinion in International Appln. No. PCT/US2020/057908, dated Feb. 10, 2021, 15 pages.
Pouladi et al., "Fast Marching Method Assisted Sector Modeling : Application to Simulation of Giant Reservoir Models" Journal of Petroleum Science and Engineering, vol. 149, Nov. 2016, 707-719, 13 pages.
Thiele et al., "Streamline-Assisted History Matching" 9th International Forum on Reservoir Simulation, Dec. 2007, 41 pages.
Thiele, "Streamline Simulation" 8th International Forum on Reservoir Simulation, Jun. 2005, 47 pages.
GCC Examination Report issued in Gulf Cooperation Council Appln. No. 2020-40772, dated Sep. 30, 2021, 3 pages.

\* cited by examiner

DYNAMIC CALIBRATION OF RESERVOIR SIMULATION MODELS USING PATTERN RECOGNITION

TECHNICAL FIELD

The present disclosure generally relates to dynamic calibration of reservoir simulation models, which may sometimes be referred to as history matching.

BACKGROUND

Reservoir simulation is an area of reservoir engineering in which computer models are used to predict the flow of fluids (typically, oil, water, and gas) through porous media. The creation of simulation models of oil fields and the calculations of field development on their basis is one area of activity of engineers and oil researchers. A reservoir simulation model can describe the physical processes active in a reservoir. One purpose of simulation is estimation of field performance (for example, oil recovery) under one or more producing schemes. While the actual field can be produced only once, at considerable expense, a model can be produced or run many times at relatively lower expense over a relatively short period of time. Observation of model results that represent different producing conditions can aid in the selection of a desired set of producing conditions for the reservoir.

History matching can generally refer to the act of adjusting a reservoir simulation model until it closely reproduces (for example, within a threshold accuracy) the past behavior of a reservoir. For example, production and pressures generated by the reservoir simulation model for a given time phase are matched with the historical production and pressures of the actual reservoir during that time phase as closely as possible. Once a reservoir simulation model is history matched, it can be used to simulate future reservoir behavior with a higher degree of confidence.

SUMMARY

This specification describes systems and methods that provide, when compared with traditional techniques, enhancements in the acceleration of reservoir simulation modeling by progressive history matching based on streamline pattern recognition. The systems and methods introduce splitting time and resource intensive history matching processes into a progressive sequence of dynamic model updates per distinctive phase of fluid recovery (for example, primary, secondary, tertiary) or drive mechanism (for example, piston drive, bottom drive). Splitting is performed in the time and space domain. Each segment of time-space domain is dynamically calibrated (that is, history matched) simultaneously (that is, in parallel), which can provide, when compared with traditional techniques, considerable savings in computational time and computational resources without compromising computational rigor. The systems and methods described in this specification can also introduce advanced spatial conditioning of no-flow boundaries/volumes by using pattern recognition based on streamline analysis and by deploying image analysis with model parameterization and dimensionality reduction.

In at least one aspect of the present disclosure, a system is provided. The system includes a computer-readable medium comprising computer-executable instructions; and at least one processor configured to execute the computer-executable instructions. When the at least one processor executes the computer-executable instructions, the at least one processor is configured to perform operations. The operations include determining one or more time segments of fluid recovery of a reservoir by analyzing a production history of the reservoir. The operations include generating, for a first time segment of the one or more distinctive time segments, one or more streamlines on a full simulation grid corresponding to the reservoir by performing one or more reservoir simulations. The operations include generating, for the first time segment, one or more drainage volumes by performing image analysis and compression on the streamlines. The operations include generating, for the first time segment, a plurality of grid regions along one or more no-flow boundaries of the one or more drainage volumes. The operations include generating, for the first time segment, a plurality of sector models corresponding to the plurality of grid regions by segmenting the full simulation grid along the one or more no-flow boundaries. The operations include performing, for the first time segment, a history matching process corresponding to a time phase simultaneously on each of the plurality of sector models to generate, for each sector model of the plurality of sector models, a history matching output. The operations include comparing, for the first time segment and for each sector model of the plurality of sector models, the history matching output for that sector model to a tolerance threshold.

The operations can further include determining, for the first time segment and based on the comparing, whether the history matching output for every sector model of the plurality of sector models satisfies the tolerance threshold. The operations can further include reconstructing, for the first time segment and in response to determining that the history matching output for every sector model satisfies the tolerance threshold, the full simulation grid by merging the plurality of sector models. The operations can further include determining whether the history matching process has been performed for all time segments of the one or more time segments. The operations can further include, in response to determining that the history matching process has not been performed for all time segments of the one or more time segments, repeating one or more of the operations for a second time segment of the one or more time segments.

The full simulation grid can include a three-dimensional simulation grid.

Performing image analysis and compression can include performing a discrete cosine transform technique. Performing image analysis and compression can include performing a pattern matching process to establish the one or more no-flow boundaries of the one or more drainage volumes.

The plurality of sector models can include at least one of: a matrix porosity model, a matrix permeability model, a fracture porosity model, a fracture permeability model, a saturation model, a rock type model, or a fluid region model.

These and other aspects, features, and implementations can be expressed as methods, apparatus, systems, components, program products, non-transitory computer storage mediums, means or steps for performing a function, and in other ways, and will become apparent from the following descriptions, including the claims.

Implementations of the present disclosure can provide one or more of the following advantages. The methods and systems introduce splitting time and resource intensive history matching into a progressive sequence of dynamic model updates, as opposed to traditional methods that performs full field history matching over long a production history. When compared with traditional approaches, the systems and methods described in this specification can reduce computer processing time. Such reduction in time can range from 47% to 86% relative to the traditional full field model simulation approaches, depending on the sector.

As used in this specification, the term drainage region can generally refer to the reservoir area drained by a well of the reservoir. As used in this specification, the term drainage volume can generally refer to the portion of the volume of a reservoir drained by a well of the reservoir.

As used in this specification, the term no-flow boundary can generally refer to a boundary of a reservoir that does not allow flow through it. For example, a no-flow boundary can result in reservoirs with sealing faults or can be created between producing wells of the reservoir that are equally spaced and producing at the same rate.

As used in this specification, a streamline trajectory can generally refer to a trajectory between a fluid injector and a producing well of a reservoir.

The details of one or more embodiments of these systems and methods are set forth in the accompanying drawings and the following description. Other features, objects, and advantages of these systems and methods will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

Like reference symbols in the various drawings indicate like elements.

DETAILED DESCRIPTION

The systems and methods described in this specification can provide for the acceleration of reservoir model simulations by introducing a split and merge approach, which can be constrained by generated drainage regions confined by no-flow boundaries. The systems and methods can split history matching over long production histories of a reservoir, which can be both time and resource intensive, into a progressive sequence of dynamic model updates per distinctive phase of fluid recovery. The splitting can be performed in the time (i) and space (j) domain, in which each segment of the time-space domain is dynamically calibrated (that is, history matched) simultaneously (that is, in parallel). This approach can be particularly useful for real-time history matching of large-scale reservoir simulation models (for example, on the order of $10^7$ grid cells and $10^4$ wells). This approach can also be particularly useful for secondary and tertiary phase well placement strategies (such as when performing flank injection and pattern injection).

Figure 1:
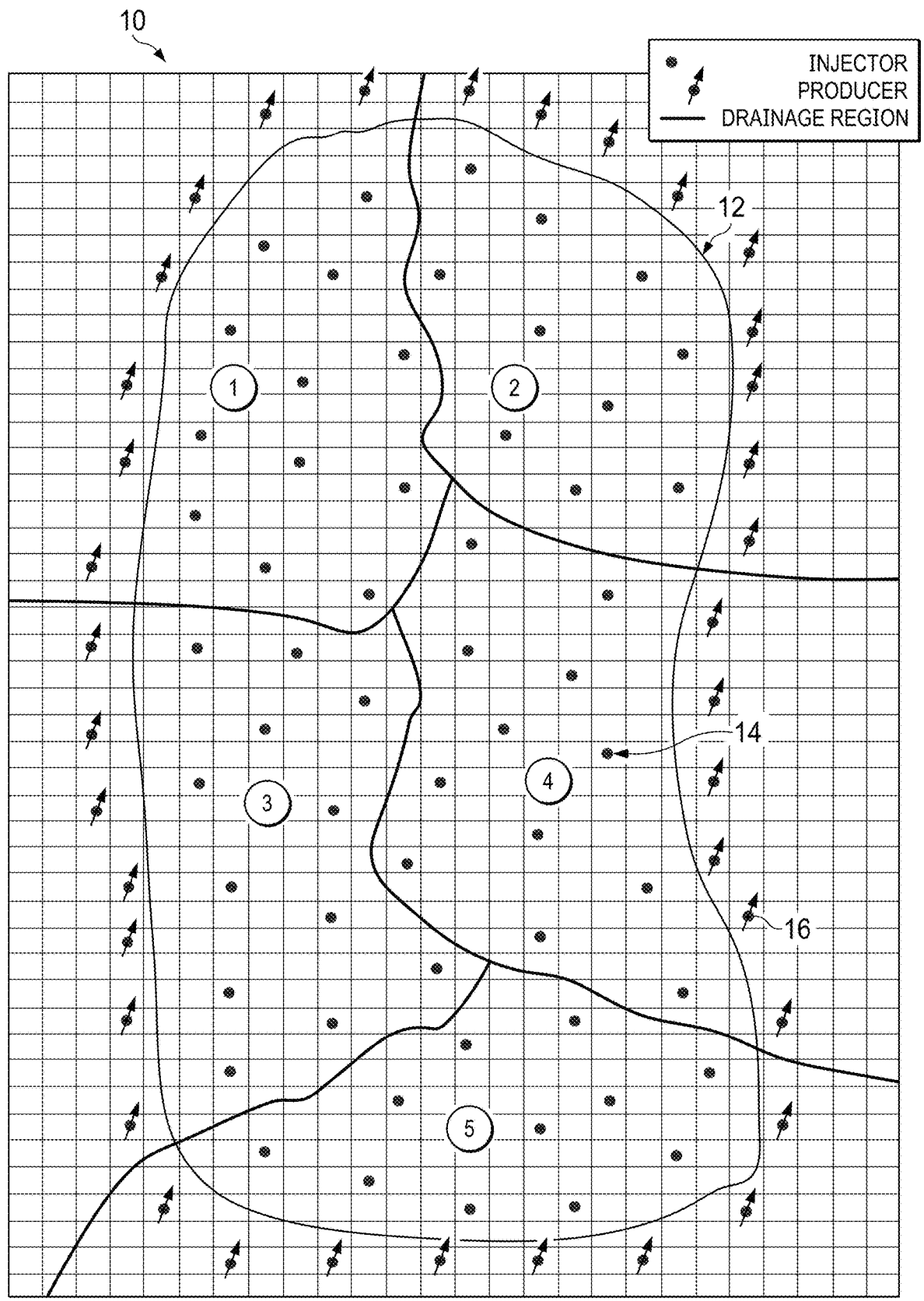
FIG. 1 is a schematic of a simulation grid for modeling a reservoir productions wells (producers) and injection wells (injectors).

FIG. 1 is a schematic of a simulation grid 10 for modeling a reservoir 12 including productions wells (producers) 14 and injection wells (injectors) 16. The reservoir 12 has 5 distinct drainage regions. After calibration, a simulation model based on the simulation grid could be used, for example, to test possible well placements before investing the time and resources required to drill the wells.

Figure 2:
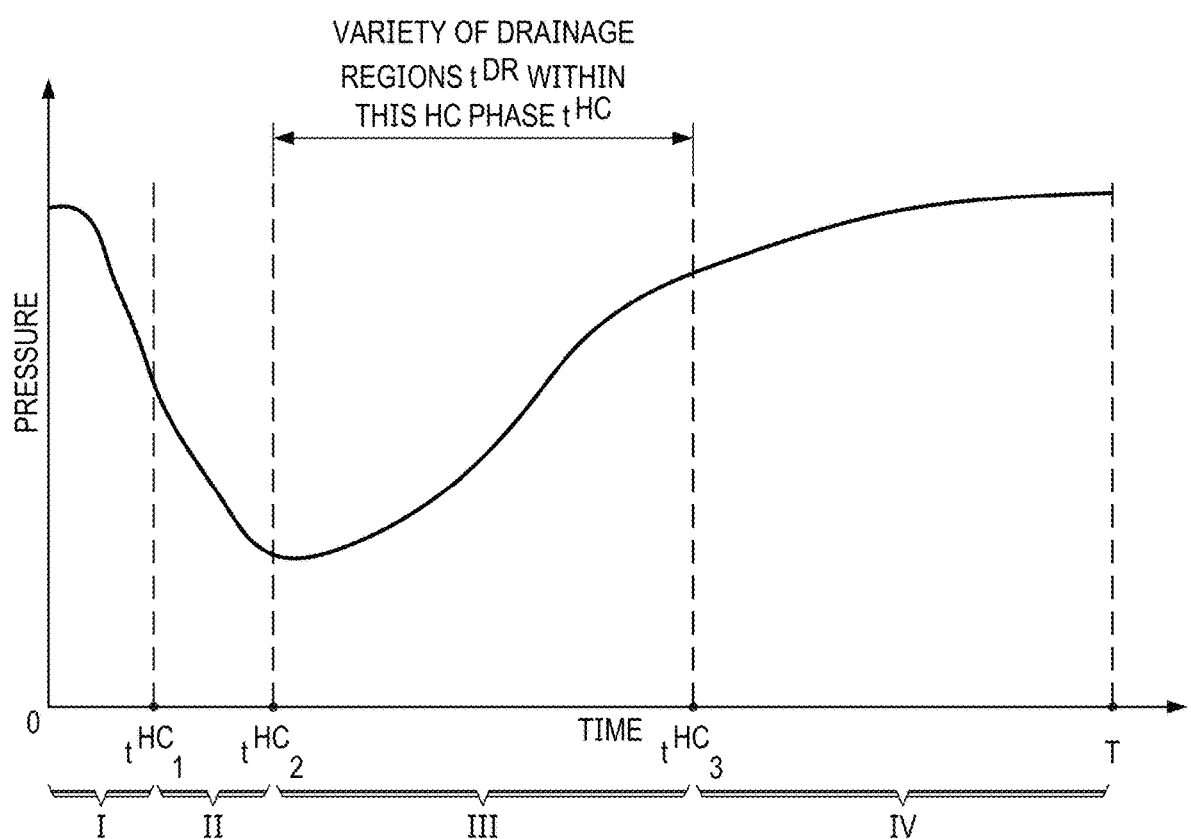
FIG. 2 is a schematic rendering of distinctive phases of hydrocarbon fluid recovery.

FIG. 2 is a schematic rendering of distinctive phases of hydrocarbon fluid recovery. FIG. 2 illustrates typical pressure behavior of a reservoir through distinctive phases of hydrocarbon recovery. Table 1 presents the relationship between hydrocarbon recovery phase, lift mechanism, and time segment.

TABLE 1

| Hydrocarbon recovery phase | Mechanism | Time segment |
|---|---|---|
| Primary | Natural flow | I, II |
|  | Artificial lift |  |
| Secondary | Water-flooding | III |
|  | Pressure maintenance |  |
| Tertiary | Thermal (steam, combustion) | IV |
|  | Gas injection (CO2, nitrogen) |  |
|  | Chemical treatment |  |
|  | Other (microbial, EM, acoustic) |  |

Hydrocarbon recovery can be defined by three phases: a primary phase, a secondary phase, and a tertiary phase. The primary phase refers to a stage in which natural reservoir energy, such as gasdrive, waterdrive, or gravity drainage, displaces hydrocarbons from the reservoir, into the wellbore, and up to the surface. In some cases, the primary phase includes artificial lift, which describes a system that adds energy to the fluid column in a wellbore with the objective of initiating and improving production from the well. The primary phase can correspond to a first time segment I and a second time segment II, as discussed later in this specification. The secondary phase refers to a stage in which an external fluid, such as water or gas, is injected into the reservoir through injection wells located in rock that has fluid communication with the production wells. The secondary phase can include maintaining reservoir pressure (that is, pressure maintenance) to displace hydrocarbons toward the wellbore (for example, using waterflooding). The secondary phase can correspond to a third time segment III, which is discussed later in this specification. The tertiary phase refers to a stage in which further hydrocarbon recovery methods are performed after the secondary phase, such as thermal methods, gas injection, and chemical flooding (for example, using alkali, surfactant, or polymer agents). Other techniques can also be involved, such as microbial techniques, electromagnetic (EM) techniques, and acoustic techniques. The tertiary phase can correspond with a fourth time segment IV, which is discussed later in this specification.

In FIG. 2, $t^{HC}$ corresponds to different phases of hydrocarbon (HC) recovery (designated with roman numerals I-IV) while $t^{DR}$ corresponds to the time associated with a given drainage region (DR) remaining approximately constant (or within the boundaries of pre-selected tolerance). A reservoir simulation model can determine the distinctive time segments by analyzing historical pressure behavior data of the given reservoir. For example, reservoir pressure typically drops during time segments I and II (that is, during the primary phase) and begins to rise during time segments III and IV (that is, during the secondary and tertiary phases).

Figure 3:
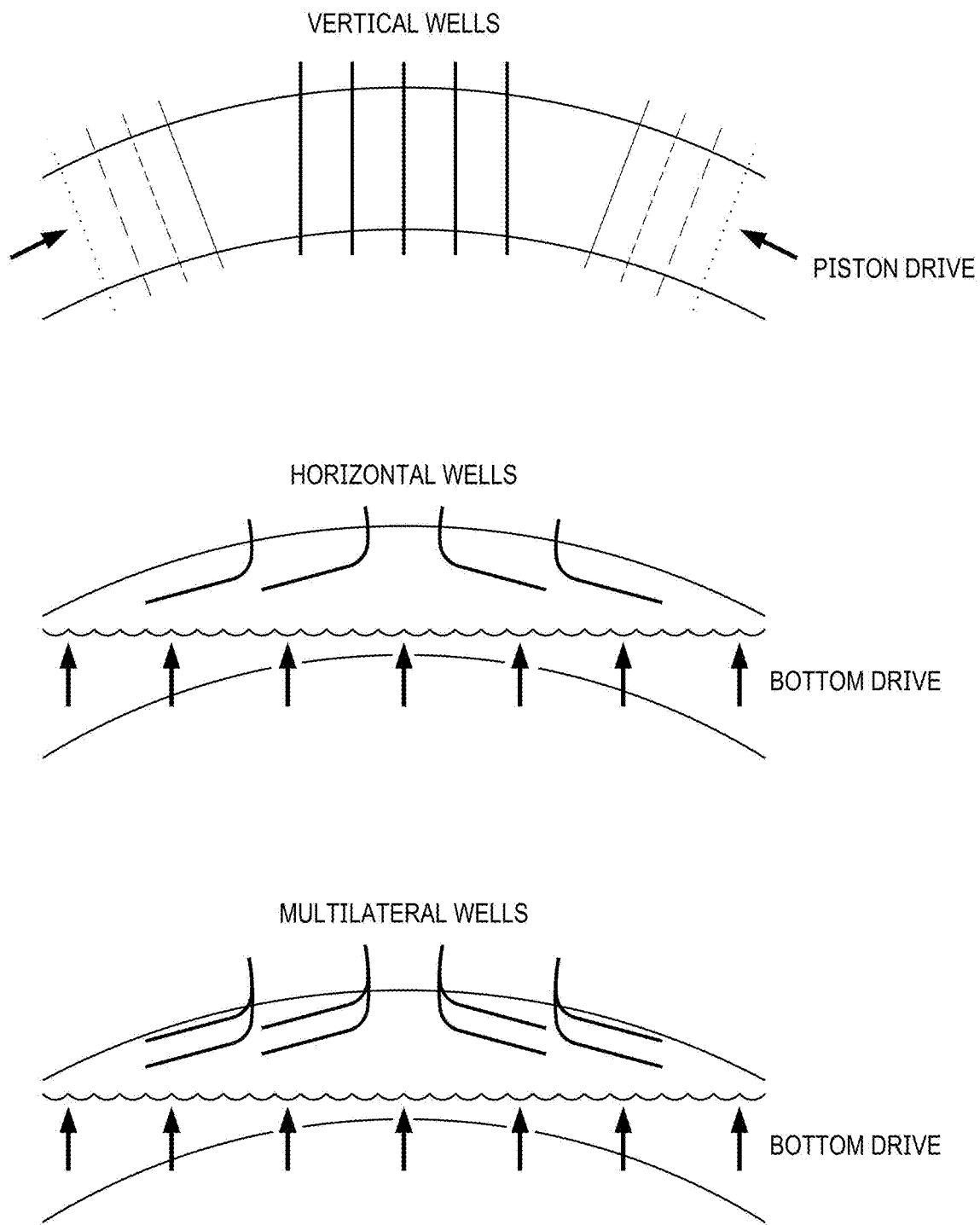
FIG. 3 is a schematic rendering of different drive mechanisms/well configurations.

FIG. 3 is a schematic rendering of different drive mechanisms/well configurations. As used in this specification, vertical wells refer to wells that use a piston like fluid mechanism for driving hydrocarbon fluid recovery. Horizontal wells and multi-lateral wells refer to wells that use bottom-up (vertical drive), as well as lateral drive mechanisms, for driving hydrocarbon fluid recovery. As will be shown later, changes in the drive mechanism/well configurations can alter a drainage regions shape in time. A model can be configured to assume drainage regions exists during a time step in which there are minimum events and consistent fluid drive mechanism. This can allow the drainage regions to be processed during this time step as a stand-alone model. The processed regions can then be combined into a full model and a new set of drainage regions can be re-created based on any time step. The can be repeated for every change in these drainage regions until a final time step is reached.

Figure 4:
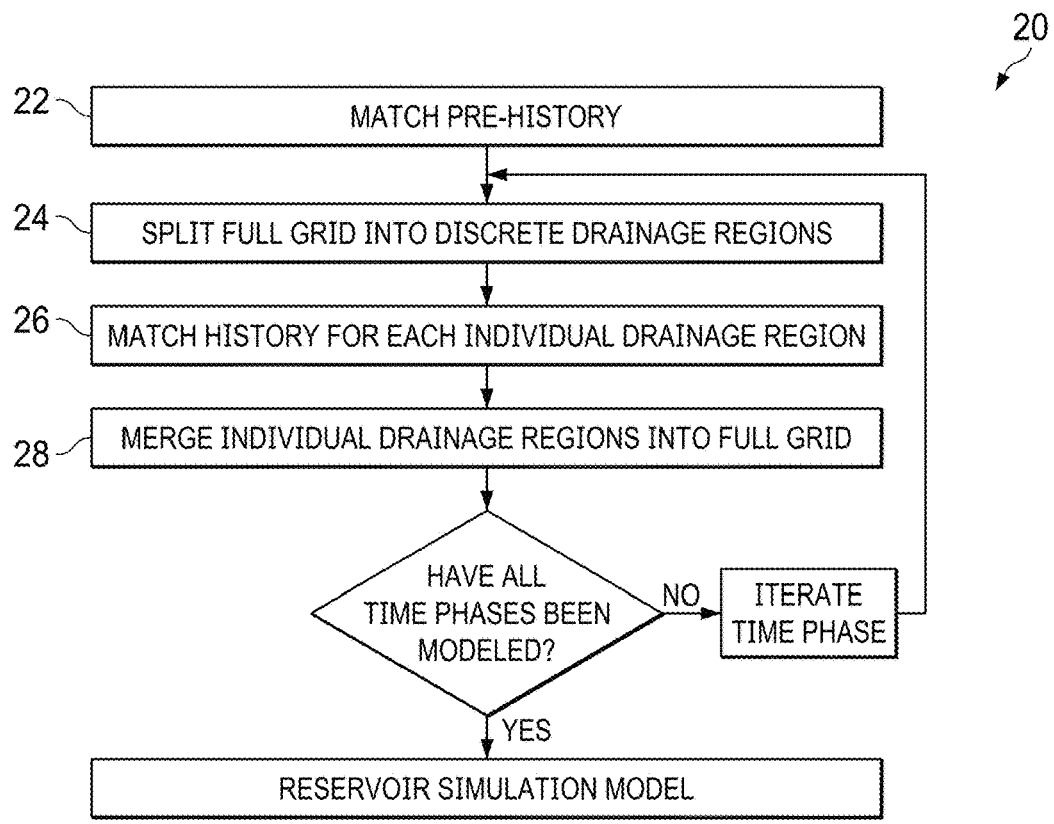
FIG. 4 is a flowchart of progressive history matching for calibrating a reservoir simulation model.
Figure 5:
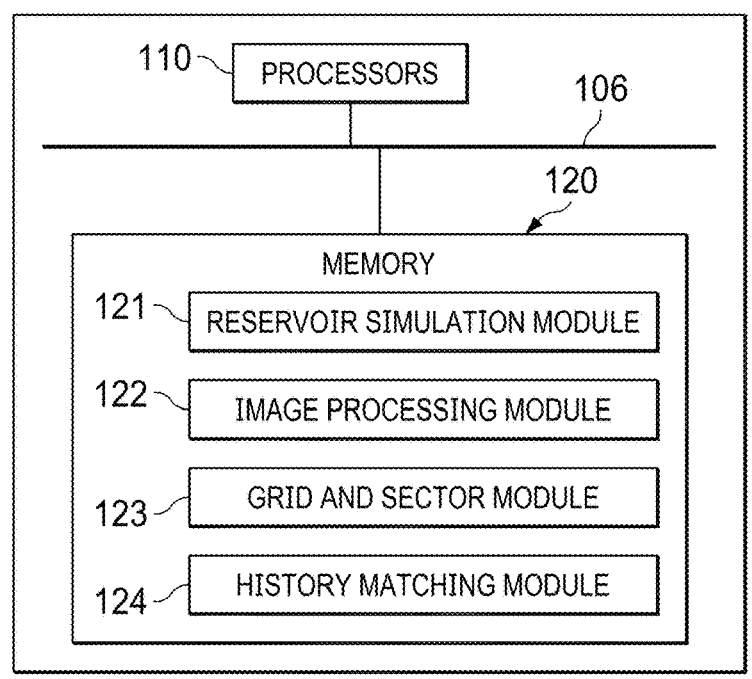
FIG. 5 is a block diagram illustrating an example system for dynamic calibration of reservoir simulation models.

FIG. 4 is a flowchart of a method 20 using progressive history matching for calibrating a reservoir simulation model. FIG. 5 is a block diagram illustrating an example system 100 for dynamic calibration of reservoir simulation models. The system 100 includes the modules mentioned in the following description of the method 20.

The method 20 combines 4 distinct steps. In a pre-history matching phase (22), a reservoir simulation module 121 can determine one or more time segments of fluid recovery of a reservoir by analyzing a production history of the reservoir. For example, historical pressure behavior data of the reservoir can be analyzed to determine distinctive time segments related to production phases of the reservoir. In a model-splitting phase (24), the grid and sector module 123 splits the full model grid (for example, the grid shown in FIG. 1) into sectors corresponding to drainage regions. In a history matching phase (26), simulation models based on the sectors corresponding to individual drainage regions calibrates the models by history matching. In a sector merge phase (28), the grid and sector module 123 merges the calibrated models for each sector back into the full model grid.

Referring to FIG. 5, the system 100 includes hardware and software components, such as one or more processors 110 and a memory 120, which are interconnected by a data bus 106. The memory 120 can be any non-transitory computer-readable storage medium and is capable of storing computer-readable instructions executable by the processors 110. In the illustrated embodiment, the memory 120 stores executable instructions associated with a reservoir simulation module 121, an image-processing module 122, a grid and sector module 123, and a history-matching module 124, to enable the system 100 or other components and devices to carry out the techniques described in this specification. As used in this specification, the term "module" is defined broadly to include, for example, any code, program, firmware, software object, or other software device or arrangement that can be executed by one or more processors to perform one or more activities, functions, or facilities.

The reservoir simulation module 121 can analyze the production history of a given reservoir and, based on the analysis, determine distinctive time segments of hydrocarbon fluid recovery for that reservoir. In the illustrated implementation, the reservoir simulation module 121 is configured based on the assumption that the reservoir simulation module under consideration automatically generates drainage regions and that the boundaries of generated drainage regions remain approximately constant during each individual distinct phase of hydrocarbon recovery.

Figure 6:
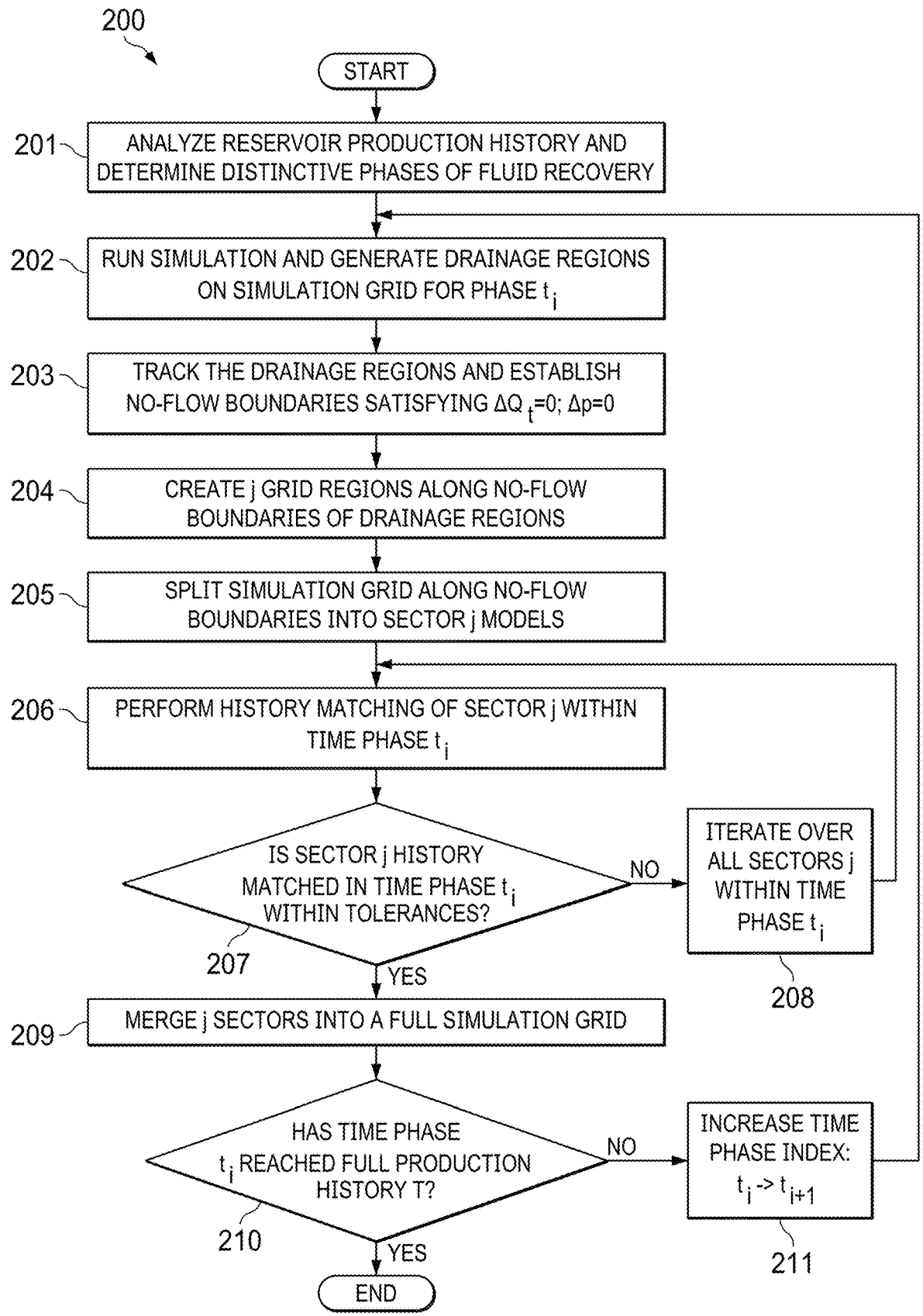
FIG. 6 is a flowchart of progressive history matching for calibrating a reservoir simulation model using the simulation model to generate drainage regions to subdivide the model.

FIG. 6 is a flowchart of a specific implementation 200 of the method of the progressive history matching method 20. This implementation uses the simulation module 121 to generate drainage regions to subdivide the model.

In a pre-history matching phase (22), the reservoir simulation module 121 determines one or more time segments of fluid recovery of a reservoir by analyzing a production history of the reservoir (201). For example, historical pressure behavior data of the reservoir can be analyzed to determine distinctive time segments related to production phases of the reservoir. These time segments correspond to phases of HC fluid recovery, drive mechanisms or well configurations discussed with references to FIGS. 2 and 3. This implementation uses a reservoir simulator that automatically generates drainage regions as the simulation module 121 and is based on the assumption that the boundaries of the generated drainage regions remain approximately constant (or within the boundaries of pre-selected tolerance) during individual distinct phases of hydrocarbon recovery, drive mechanism or well configuration, $t_i$. This assumption is more appropriate when wellfield configurations and fluid allocation offset intake or injection remain consistent. When new wells are drilled or fluid allocations change in the calibration data set, $t_i$ is incremented and a new set of drainage regions is generated In a model-splitting phase (24), the grid and sector module 123 splits the full model grid (for example, the grid shown in FIG. 1) into sectors corresponding to drainage regions. In this implementation, a reservoir simulation is run that generates drainage regions on full-size simulation grid (202). The simulation time corresponds to the distinct phase of hydrocarbon, $t_i$ where $t_i \subset (0, T)$, i=index of distinctive phase of fluid recovery; and T is the full production history of the reservoir As previously discussed, this implementation uses a reservoir simulator that automatically generates drainage regions as the simulation module 121. The boundaries of generated drainage regions are automatically tracked and assigned the no-flow boundary conditions as per $\Delta Q \approx 0$ and $\Delta p \approx 0$, which represent approximate zero fluid flow difference and approximate zero pressure difference on the boundary surface, respectively (203). For example, these boundary lines separate the drainage regions shown in FIG. 1 The tolerances for assigning the $\Delta Q_f \approx 0$ and $\Delta p \approx 0$ condition are specified as:

$$\Delta Q_f^j(t_i) - \Delta Q_f^j(t_{i-1}) << \varepsilon_Q \quad (1)$$

$$\Delta p^j(t_i) - \Delta p^j(t_{i-1}) << \varepsilon_p \quad (2)$$

where indices j and I run over distinctive phases of fluid recovery and number of distinctive drainage regions, respectively. The residual error c is determined based on computational convergence error of the solver built in reservoir simulator. These boundaries between flow regions are conformed to the grid to create j sub-grid regions with assigned corresponding reservoir simulation model properties (for example, matrix porosity, matrix permeability, fracture porosity, fracture permeability, saturation, rock types, and fluid regions) (204).

Figure 7:
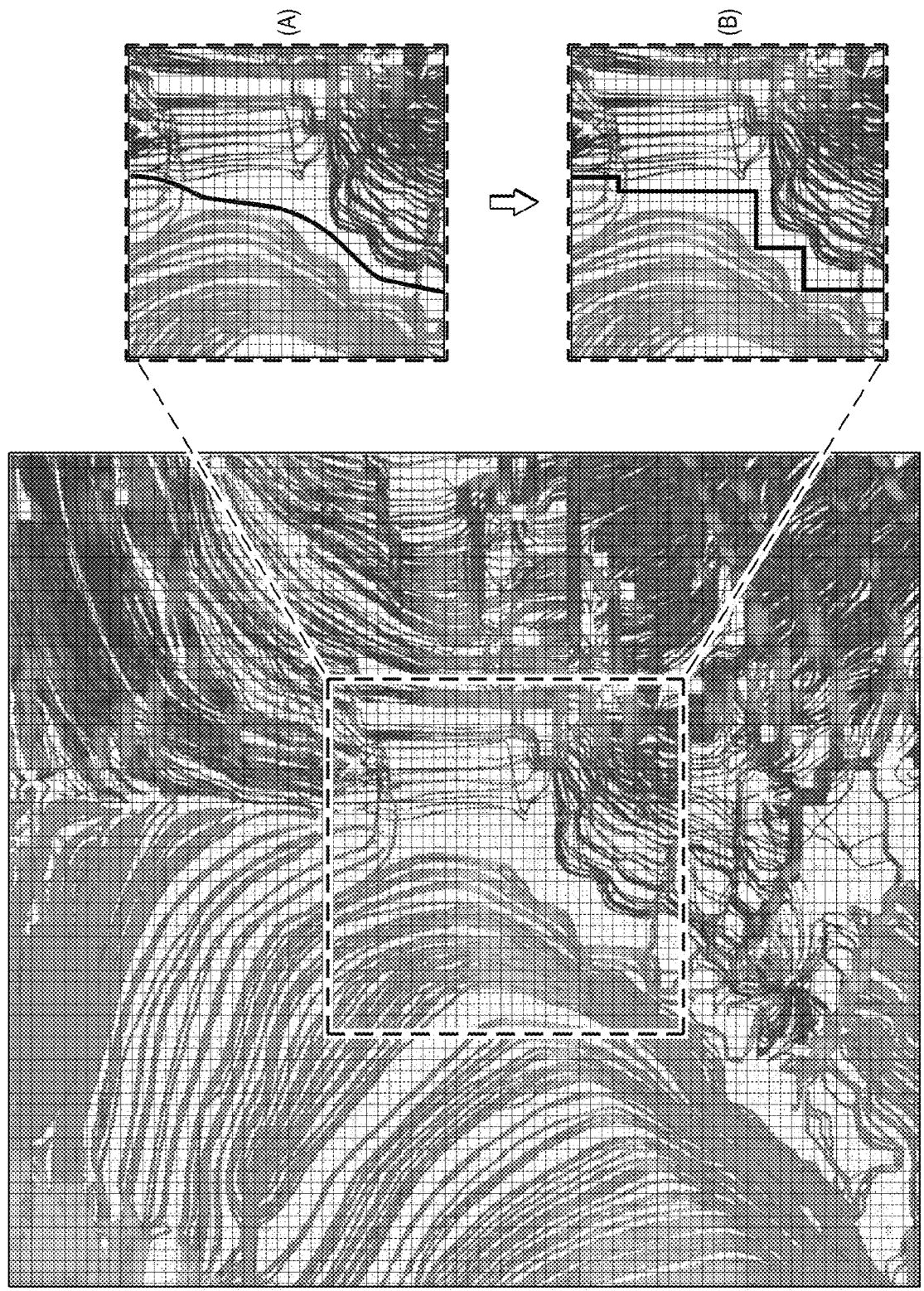
FIG. 7 is a schematic illustrating on-the-grid tracking of no-flow boundaries to create grid-conformed boundaries for drainage region splitting process.

FIG. 7 is a schematic illustrating this process of tracking of no-flow boundaries to create grid-conformed boundaries for drainage region splitting process. As shown, the boundaries of drainage regions defined by streamlines are tracked (A), and grid-conformed boundaries of drainage regions defined by streamlines are created (B). In the illustrated implementation, the grid-conformed boundaries are created by aggregating the assigned no-flow boundary conditions $\Delta Q_f \approx 0$ and $\Delta p \approx 0$, which reflect approximate zero fluid flow difference and approximate zero pressure difference on all the boundary surfaces, respectively. Pattern recognition techniques (such as, streamline-based registration, clustering, or both) are used to track and generate separation lines along the outer boundaries of any region divided by the $\Delta Q_f \approx 0$ and $\Delta p \approx 0$ conditions. A snap-to-grid approach is used to conform the separation lines to the underlying reservoir simulation grid.

Referring back to FIG. 6, after the grid-conformed boundaries are created, the simulation grid is automatically split into j sub-grids corresponding to j simulation models sectors confined by no-flow boundaries (205)

In a history matching phase (26), simulation models based on the sectors corresponding to individual drainage regions calibrate the models by history matching. Referring back to FIG. 4, the history-matching module 124 performs history matching for each of the j sector models simultaneously for each time segment, usually beginning with the first time segment I (206). In the illustrated implementation, history matching is performed using computer-assisted history matching (AHM). In some implementations, history matching is performed using a traditional manual approach. In some implementations, simultaneous simulation job submission is performed by using parallel high performance computing. In this implementation, the process 100 sequentially monitors and checks if the history matching performed on the sector models is completed for all sectors within specified accuracy and precision tolerances (207-208). If not, the history matching (206) is repeated until conditions are met.

In the sector merge phase (28), the grid and sector module 123 merges the calibrated models for each sector back into the full model grid. Once the specified accuracy and precision tolerances are achieved, the j sub-grids, corresponding to j simulation sector models are automatically merged back into a full-size simulation grid, which includes all reservoir simulation model properties previously split into the sector models (209).

This process is repeated for each time phase until the time phase $t_i$ of the production history has reached full production history T (210-211).

Figure 8:
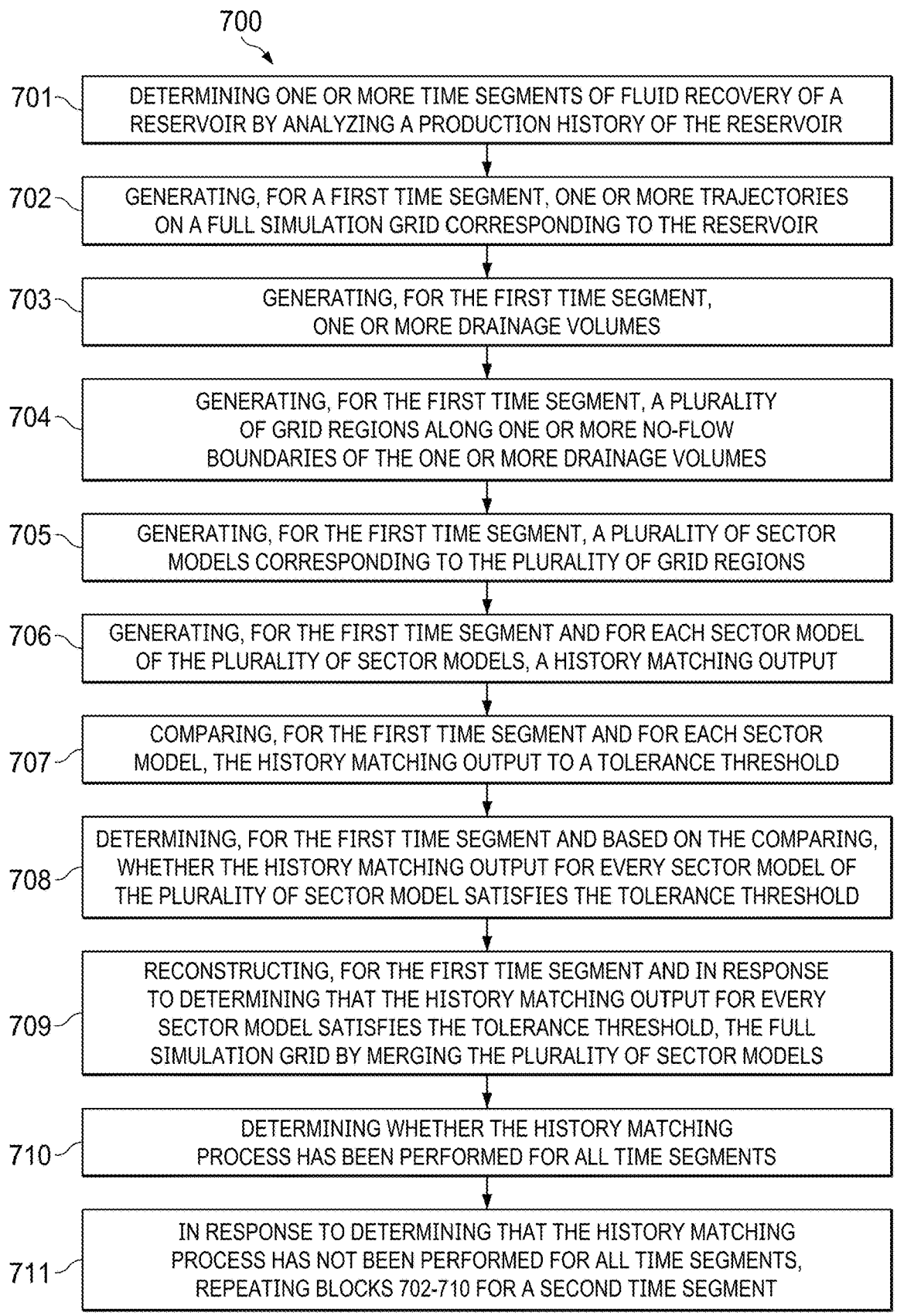
FIG. 8 is a flowchart of progressive history matching for calibrating a reservoir simulation model using streamline pattern recognition to generate drainage regions to subdivide the model.

FIG. 8 is a flowchart showing another implementation 700 of the method 20 for dynamic calibration of a reservoir simulation model. This implementation is substantially similar to the implementation 200 but uses streamline pattern recognition to generate drainage regions to subdivide the model.

The method 700 includes determining one or more time segments of fluid recovery of a reservoir by analyzing a production history of the reservoir (block 701). For example, historical pressure behavior data of the reservoir can be analyzed to determine distinctive time segments related to production phases of the reservoir.

The method 700 includes generating, for a first time segment of the one or more time segments, one or more streamline trajectories on a full simulation grid corresponding to the reservoir (block 702). To generate the one or more streamline trajectories, one or more reservoir simulations can be performed, as described previously with reference to FIG. 1 and FIG. 3. In some implementations, the full simulation grid includes a three-dimensional simulation grid.

The method 700 includes generating, for the first time segment, one or more drainage volumes (block 703). The one or more drainage volumes can be generated by performing image analysis and compression on the generated one or more streamline trajectories. In some implementations, performing image analysis and compression includes performing a discrete cosine transform technique. In some implementations, performing image analysis and compression includes performing a pattern matching process.

The method 700 includes generating, for the first time segment, a plurality of grid regions along one or more no-flow boundaries of the one or more drainage volumes (block 704). The method 700 includes generating, for the first time segment, a plurality of sector models corresponding to the plurality of grid regions (block 705).

The method 700 includes generating, for the first time segment and for each sector model of the plurality of sector models, a history matching output (block 706). For example, the history matching can estimate a field performance amount (such as an oil recovery amount) of the reservoir during the first time segment. The method 700 includes comparing, for the first time segment and for each sector model, the history matching output to a tolerance threshold (block 707). The tolerance threshold can be based on accuracy and precision tolerances.

The method 700 includes determining, for the first time segment and based on the comparing, whether the history matching output for every sector model of the plurality of sector models satisfies the tolerance threshold (block 708). For example, the history matching output can be compared with observed real-world output, and based on that comparison, the accuracy, precision, or both, of the history matching process can be determined.

The method 700 includes reconstructing, for the first time segment and in response to determining that the history matching output for every sector model satisfies the tolerance threshold, the full simulation grid by merging the plurality of sector models (block 709).

The method 700 includes, determining whether the history matching process has been performed for all time segments (block 710), and, in response to determining that the history matching process has not been performed for all time segments, repeating block 702-710 for a second time segment (block 711).

Figure 9:
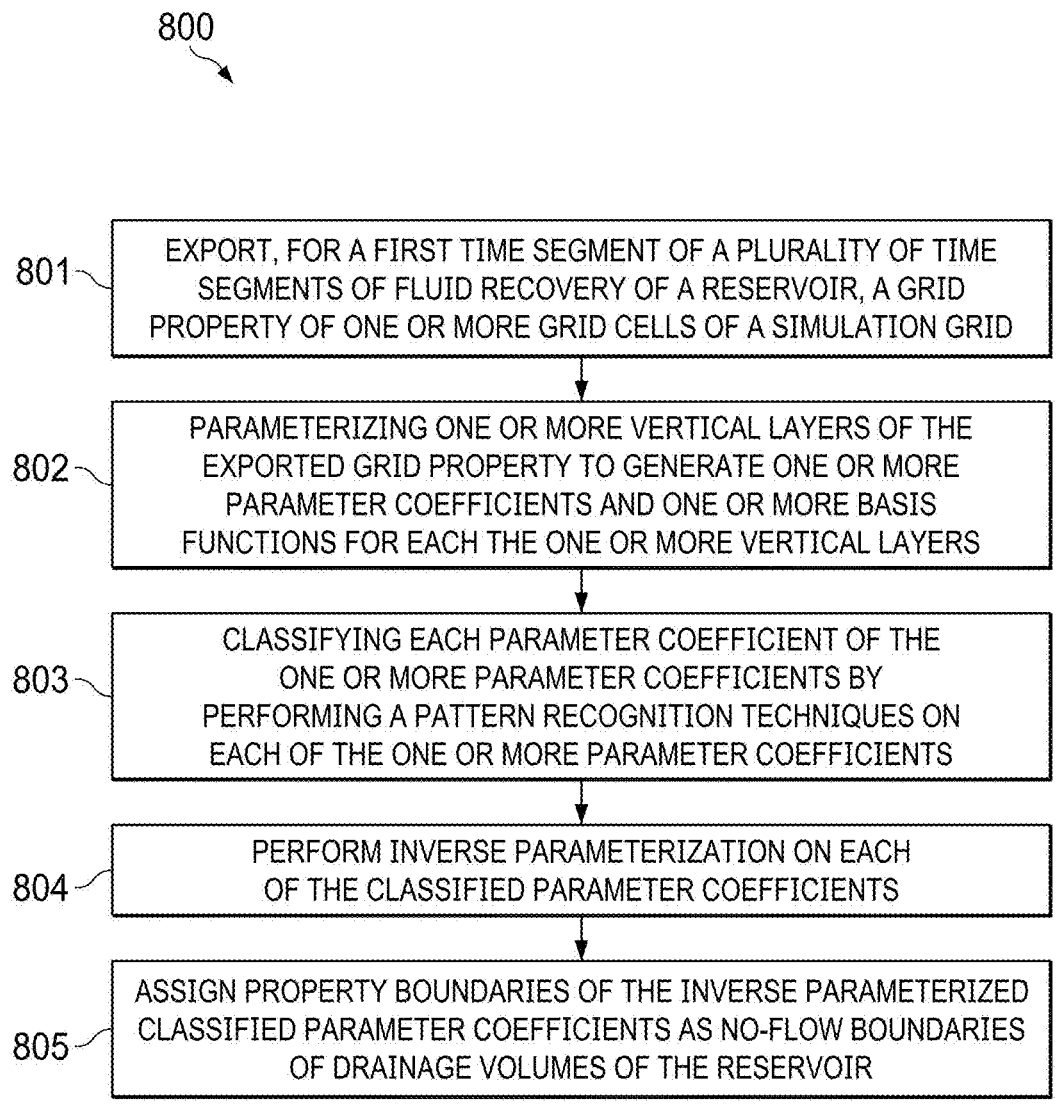
FIG. 9 is a flowchart further detailing the streamline pattern recognition used to generate drainage regions to subdivide the model in the method of FIG. 8.

FIG. 9 is a flowchart further detailing the streamline pattern recognition used to generate drainage regions to subdivide the model in the method of FIG. 8. The flowchart shows a method 800 for performing image analysis and compression. The method 800 includes exporting, for a first time segment of a plurality of time segments of fluid recovery of a reservoir, a grid property of one or more grid cells of a simulation grid (block 801).

The method 800 includes parameterizing one or more vertical layers of the exported grid property to generate one or more parameter coefficients and one or more basis functions for each the one or more vertical layers (block 802). In some implementations, parameterizing includes performing DCT parameterization.

The method 800 includes classifying each parameter coefficient of the one or more parameter coefficients by performing a pattern recognition technique on each of the one or more parameter coefficients (block 803). In some implementations, the pattern recognition technique includes performing k-means clustering. In some implementations, the pattern recognition technique includes performing one or more machine learning techniques.

The method 800 includes performing inverse parameterization on each of the classified parameter coefficients (block 804). In some implementations, performing inverse parameterization includes performing two-dimensional DCT parameterization.

The method 800 includes assigning property boundaries of the inverse parameterized classified parameter coefficients as no-flow boundaries of drainage volumes of the reservoir (block 805).

Figure 10:
FIG. 10 illustrates streamline trajectories generated by and extracted from full physics, finite-difference simulation of a reservoir.

FIG. 10 illustrates streamline trajectories generated by and extracted from full physics, finite-difference simulation of a reservoir. As shown, the streamline trajectories show flow connectivity between individual injectors (such as fluid injectors) and corresponding hydrocarbon (HC) producers. Referring back to FIG. 5, the reservoir simulation module 121 is capable of performing a reservoir simulation for the given reservoir to generate streamline trajectories on a three-dimensional simulation grid for the given reservoir for a particular time segment ($t_i$), typically beginning with time segment I. In the illustrated implementation, the simulation time used for the given reservoir corresponds to each distinct phase of hydrocarbon recovery. In the illustrated implementation, the reservoir simulation module 121 is capable of performing full physics, finite-difference simulation to generate the streamline trajectories.

Referring back to FIG. 1, the image-processing module 122 is capable of performing image analysis and image compression on the generated one or more streamline trajectories to generate three-dimensional streamline-conditioned drainage volumes for each distinct time segment of hydrocarbon recovery, typically beginning with time segment I. In some implementations, the image-processing module 122 is capable of performing image analysis and compression using a discrete cosine transform (DCT) to generate drainage volumes for each distinct phase of hydrocarbon recovery.

In the illustrated implementation, performing image analysis includes one or more of the following steps. For a current time segment, the image-processing module 122 automatically extracts grid cell blocks, which are traversed by streamline trajectories, and converts them into a three-dimensional grid property for the current time segment. The image-processing module 122 performs two-dimensional DCT parameterization on a vertical layer k of the extracted grid property. The image-processing module 122 stores DCT coefficients and basis functions corresponding to the vertical layer k of the parameterized grid property in an intermediate array. The image-processing module 122 monitors the progress of DCT parameterization as a function of gird vertical layers. The extraction and parameterization is performed until all grid vertical layers are parameterized using the two-dimensional DCT parameterization. The image-processing module 122 performs multi-label classification pattern recognition on the stored DCT coefficients. In the illustrated implementation, performing pattern recognition includes performing k-means clustering. In some implementations, performing pattern recognition includes using one or more machine learning techniques (for example, naive Bayesian techniques and neural networks). In some implementations, performing pattern recognition includes using support vector machine techniques. The image-processing module 122 stores the classified DCT coefficients and basis functions for all layers of the streamline grid-cell three-dimensional property. The image-processing module 122 performs inverse two-dimensional DCT parameterization on the stored classified DCT coefficients for all layers of the streamline grid-cell three-dimensional property. The image-processing module 122 assigns the property boundaries resulting from DCT inversion as no-flow boundaries of drainage volumes, as per $\Delta Qf \approx 0$ and $\Delta v \approx 0$, which represent approximate zero fluid flow difference and approximate zero pressure difference on the boundary surface, respectively.

Following the distinctive no-flow boundaries, the grid and sector module 123 is capable of generating a plurality of j sub-grid regions and assigning each j grid region a corresponding reservoir simulation model property (for example, matrix porosity, matrix permeability, fracture porosity, fracture permeability, saturation, rock type, and fluid regions).

Figure 11:
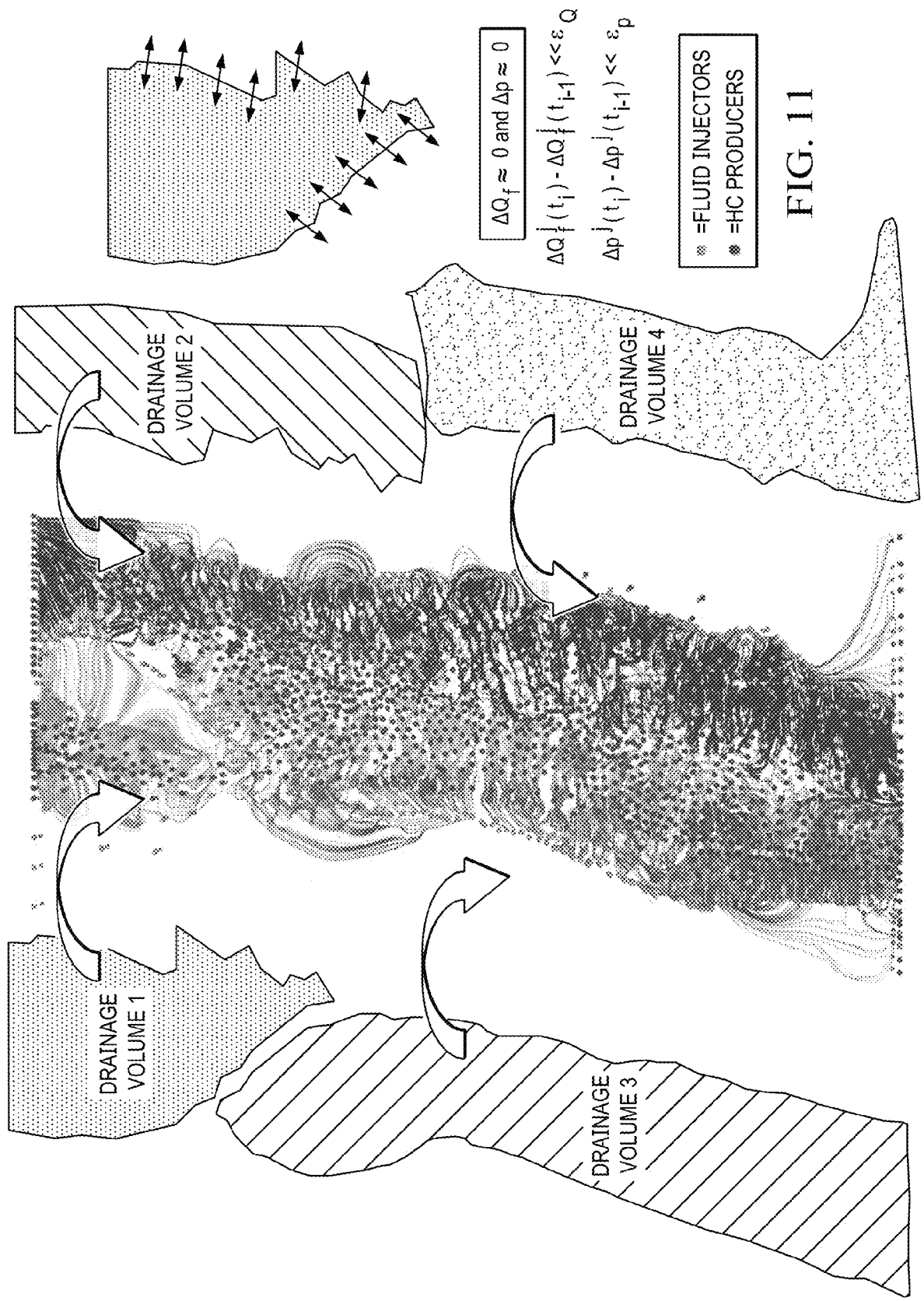
FIG. 11 illustrates splitting a model of the reservoir shown in FIG. 10 into 3 drainage volumes following distinctive no-flow boundaries.

FIG. 11 illustrates splitting a model of the reservoir shown in FIG. 10 into 3 drainage volumes following distinctive no-flow boundaries. The grid and sector module 123 splits the simulation grid into j sub-grids corresponding to j simulation model sectors confined by no-flow boundaries. The no-flow boundaries of extracted drainage regions are discretized on the existing grid. The j sub-grid regions are automatically created with assigned corresponding reservoir simulation model properties (such as matrix porosity, matrix permeability, fracture porosity, fracture permeability, saturation, rock type, fluid regions).

Figure 12:
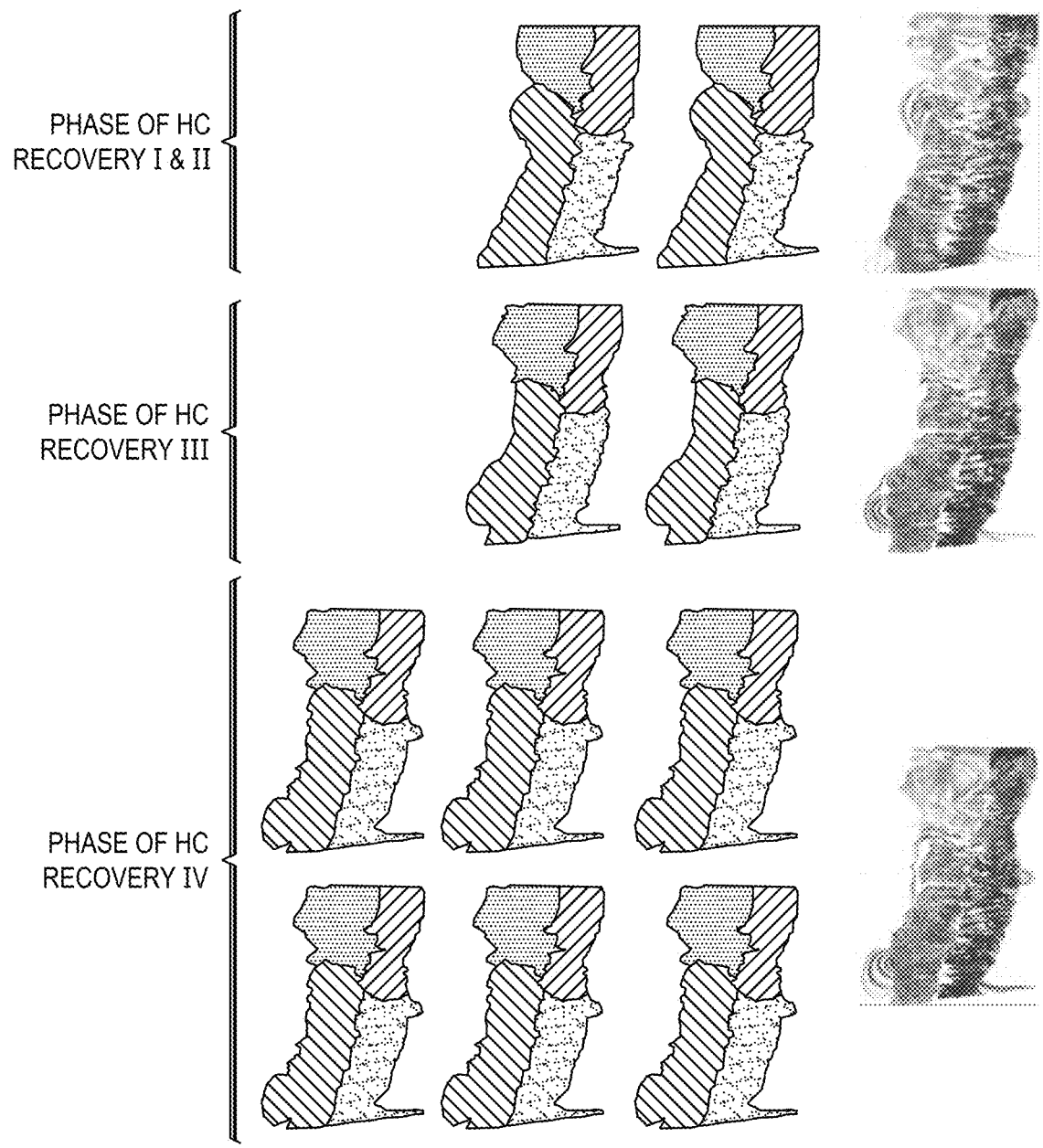
FIG. 12 schematically illustrates the process of sector model processing in reservoir simulation in conjuncture with typical reservoir pressure behavior through distinctive phases of hydrocarbon recovery.

FIG. 12 schematically illustrates the process of sector model processing in reservoir simulation in conjuncture with typical reservoir pressure behavior through distinctive phases of hydrocarbon recovery. As shown, the entire history of hydrocarbon recovery for this reservoir can be represented in 10 distinctive time steps. Time steps 1 and 2 jointly represent time segments I and II, and the spatial streamline distribution remain unchanged within the tolerances of no-flow boundaries as defined previously with respect to equations (1) and (2). Times steps 3 and 4 jointly represent time segment III and the spatial streamline distribution remain unchanged within the tolerances of no-flow boundaries as defined by equations (1) and (2). Time steps 5 through 10 jointly represent time segment IV, and the spatial streamline distribution remain unchanged within the tolerances of no-flow boundaries as defined by equations (1) and (2).

Referring back to FIG. 1, the history-matching module 124 is capable of sequentially monitoring and verifying that the history matching process performed on the j sector models is completed for all j sectors within desired accuracy and precision tolerances for each given time segment, usually beginning with time segment I. If the accuracy and precision tolerances for all j sectors is not satisfied, another iteration of history matching is performed for a given time segment.

Once the desired accuracy and precision tolerances are satisfied, the history-matching module 124 merges the j sub-grids, which correspond to j simulation sector models, into a full-size simulation grid, which corresponds to all reservoir simulation model properties. The history-matching module 124 then monitors and verifies that all time segments have been history matched. If not, then the time segment is increased by one and the reservoir simulation module performs a simulation to generate streamline trajectories for the next time segment.

Although specific modules, including the reservoir simulation module 121, the image-processing module 122, the grid and sector module 123, and the history-matching module 124 are described as carrying out certain aspects of the techniques described in this specification, some or all of the techniques may be carried out by additional, fewer, or alternative modules in some implementations.

Table 2 is a chart depicting the results of using the techniques described in this specification compared with traditional full-field approaches. Several normalization factors were defined to compare overall simulation times associated with full field approaches and sector model approaches. The normalization factors were defined as follows: (1) Norm_CPU=Normalization for Total number of cells per CPU=Runtime*(Total Cells/CPU number) and (2) Norm_Wells=Normalization using Active Wells fact=Norm_CPU*(No_of_Wells/Max_number_of_Wells. The results shown in Table 2 indicate that the techniques described in this specification enable reduction in computational time ranging between 47% and 86%, when compared with the full field model simulation.

TABLE 2

| Model | CPU No. | Total Cells | Norm_CPU | Norm_CPU_% | Active Cells | Norm_Wells | Runtime (h) |
|---|---|---|---|---|---|---|---|
| FULL FIELD | 6000 | 1.30E+09 | 3.25E+06 | 100.0 | 4.79E+08 | 100.0 | 15.0 |
| Sector 1 | 4000 | 5.02E+08 | 1.00E+06 | 30.9 | 2.45E+07 | 14.7 | 8.0 |
| Sector 2 | 3,000 | 3.31E+08 | 2.32E+05 | 7.1 | 2.23E+07 | 1.2 | 2.1 |
| Sector 3 | 1,000 | 3.18E+08 | 1.21E+06 | 37.1 | 1.57E+07 | 9.7 | 3.8 |
| Sector 4 | 1,000 | 4.20E+08 | 1.80E+06 | 55.5 | 5.47E+06 | 5.0 | 4.3 |

Figure 13:
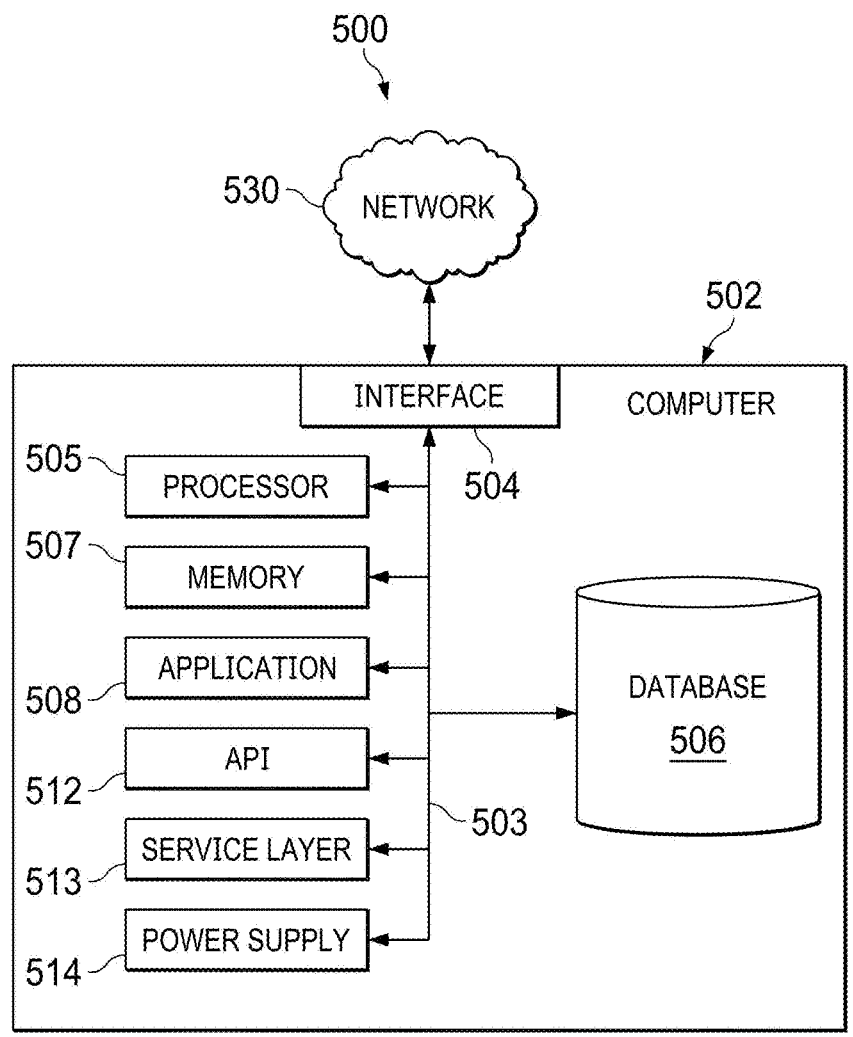
FIG. 13 is a block diagram of an example computer system used to provide computational functionalities associated with described algorithms, methods, functions, processes, flows, and procedures described in the present disclosure.

FIG. 13 is a block diagram of an example computer system 500 used to provide computational functionalities associated with described algorithms, methods, functions, processes, flows, and procedures described in the present disclosure (such as the method 300 described previously with reference to FIG. 3), according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 9, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 9, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 9, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 9, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/–R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure.

What is claimed is:

1. A computer-implemented method for validating reservoir simulation models, comprising:
   determining one or more distinctive time segments of fluid recovery of a reservoir by analyzing a production history of the reservoir;
   generating, for a first time segment of the one or more distinctive time segments, one or more streamlines on a full simulation grid corresponding to the reservoir by performing one or more reservoir simulations;
   generating, for the first time segment, one or more drainage volumes by performing image analysis and compression on the streamlines;
   generating, for the first time segment, a plurality of grid regions along one or more no-flow boundaries of the one or more drainage volumes;
   executing, using a grid and sector module, a model-splitting phase that splits the full simulation grid along the one or more no flow boundaries corresponding to each of the one or more drainage volumes;
   generating, for the first time segment, a plurality of sector models corresponding to the plurality of grid regions based on a splitting of the full simulation grid executed using the grid and sector module;
   concurrently performing, for the first time segment, a history matching process corresponding to a time phase on each of the plurality of sector models;
   generating, for each sector model of the plurality of sector models, a history matching output in response to performing the history matching process; and
   comparing, for the first time segment and for each sector model of the plurality of sector models, the history matching output for that sector model to a tolerance threshold.

2. The method of claim 1, further comprising:
   determining, for the first time segment and based on the comparing, whether the history matching output for every sector model of the plurality of sector models satisfies the tolerance threshold; and
   reconstructing, for the first time segment and in response to determining that the history matching output for every sector model satisfies the tolerance threshold, the full simulation grid by merging the plurality of sector models.

3. The method of claim 2, further comprising:
   determining whether the history matching process has been performed for all time segments of the one or more distinctive time segments; and
   in response to determining that the history matching process has not been performed for all time segments of the one or more distinctive time segments, performing the history matching process for at least a second time segment of the one or more distinctive time segments.

4. The method of claim 1, wherein the full simulation grid includes a three-dimensional simulation grid.

5. The method of claim 1, wherein performing image analysis and compression includes performing a discrete cosine transform technique.

6. The method of claim 1, wherein performing image analysis and compression includes performing a pattern matching process to establish the one or more no-flow boundaries of the one or more drainage volumes.

7. The method of claim 1, wherein the plurality of sector models includes at least one of: a matrix porosity model, a matrix permeability model, a fracture porosity model, a fracture permeability model, a saturation model, a rock type model, or a fluid region model.

8. A system comprising:
a computer-readable medium comprising computer-executable instructions; and
at least one processor configured to execute the computer-executable instructions, wherein when the at least one processor executes the computer-executable instructions the at least one processor is configured to perform operations comprising:
determining one or more distinctive time segments of fluid recovery of a reservoir by analyzing a production history of the reservoir;
generating, for a first time segment of the one or more distinctive time segments, one or more streamlines on a full simulation grid corresponding to the reservoir by performing one or more reservoir simulations;
generating, for the first time segment, a plurality of grid regions along one or more no-flow boundaries of the one or more drainage volumes;
executing, using a grid and sector module, a model-splitting phase that splits the full simulation grid along the one or more no flow boundaries corresponding to each of the one or more drainage volumes;
generating, for the first time segment, a plurality of sector models corresponding to the plurality of grid regions based on a splitting of the full simulation grid executed using the grid and sector module;
concurrently performing, for the first time segment, a history matching process corresponding to a time phase on each of the plurality of sector models;
generating, for each sector model of the plurality of sector models, a history matching output in response to performing the history matching process; and
comparing, for the first time segment and for each sector model of the plurality of sector models, the history matching output for that sector model to a tolerance threshold.

9. The system of claim 8, the operations further comprising:
determining, for the first time segment and based on the comparing, whether the history matching output for every sector model of the plurality of sector models satisfies the tolerance threshold; and
reconstructing, for the first time segment and in response to determining that the history matching output for every sector model satisfies the tolerance threshold, the full simulation grid by merging the plurality of sector models.

10. The system of claim 9, the operations further comprising:
determining whether the history matching process has been performed for all time segments of the one or more distinctive time segments; and
in response to determining that the history matching process has not been performed for all time segments of the one or more distinctive time segments, performing the history matching process for at least a second time segment of the one or more distinctive time segments.

11. The system of claim 8, wherein the full simulation grid includes a three-dimensional simulation grid.

12. The system of claim 8, wherein performing image analysis and compression includes performing a discrete cosine transform technique.

13. The system of claim 8, wherein performing image analysis and compression includes performing a pattern matching process to establish the one or more no-flow boundaries of the one or more drainage volumes.

14. The system of claim 8, wherein the plurality of sector models includes at least one of: a matrix porosity model, a matrix permeability model, a fracture porosity model, a fracture permeability model, a saturation model, a rock type model, or a fluid region model.

15. A non-transitory computer storage medium encoded with computer program instructions that when executed by one or more computers cause the one or more computers to perform operations comprising:
determining one or more distinctive time segments of fluid recovery of a reservoir by analyzing a production history of the reservoir;
generating, for a first time segment of the one or more distinctive time segments, one or more streamlines on a full simulation grid corresponding to the reservoir by performing one or more reservoir simulations;
generating, for the first time segment, a plurality of grid regions along one or more no-flow boundaries of the one or more drainage volumes;
executing, using a grid and sector module, a model-splitting phase that splits the full simulation grid along the one or more no flow boundaries corresponding to each of the one or more drainage volumes;
generating, for the first time segment, a plurality of sector models corresponding to the plurality of grid regions based on a splitting of the full simulation grid executed using the grid and sector module;
concurrently performing, for the first time segment, a history matching process corresponding to a time phase on each of the plurality of sector models;
generating, for each sector model of the plurality of sector models, a history matching output in response to performing the history matching process; and
comparing, for the first time segment and for each sector model of the plurality of sector models, the history matching output for that sector model to a tolerance threshold.

16. The non-transitory computer storage medium of claim 15, the operations further comprising:
determining, for the first time segment and based on the comparing, whether the history matching output for every sector model of the plurality of sector models satisfies the tolerance threshold; and
reconstructing, for the first time segment and in response to determining that the history matching output for every sector model satisfies the tolerance threshold, the full simulation grid by merging the plurality of sector models.

17. The non-transitory computer storage medium of claim 16, further comprising:
   determining whether the history matching process has been performed for all time segments of the one or more distinctive time segments; and
   in response to determining that the history matching process has not been performed for all time segments of the one or more distinctive time segments, performing the history matching process for at least a second time segment of the one or more distinctive time segments.

18. The non-transitory computer storage medium of claim 15, wherein the full simulation grid includes a three-dimensional simulation grid.

19. The non-transitory computer storage medium of claim 15, wherein performing image analysis and compression includes performing a discrete cosine transform technique.

20. The non-transitory computer storage medium of claim 15, wherein performing image analysis and compression includes performing a pattern matching process to establish the one or more no-flow boundaries of the one or more drainage volumes.

* * * * *